Jan. 22, 1924.　　　　　　　　　　　　　　　　　　　1,481,489
G. T. TRUNDLE, JR
MACHINE FOR FEEDING ENVELOPES TO TYPEWRITING MACHINES
Filed Jan. 21, 1921　　　8 Sheets-Sheet 1

Jan. 22, 1924.

G. T. TRUNDLE, JR 1,481,489

MACHINE FOR FEEDING ENVELOPES TO TYPEWRITING MACHINES

Filed Jan. 21, 1921    8 Sheets-Sheet 2

Inventor:
George T. Trundle Jr.
by
Freese, Merkil & Saywell,
Attorneys.

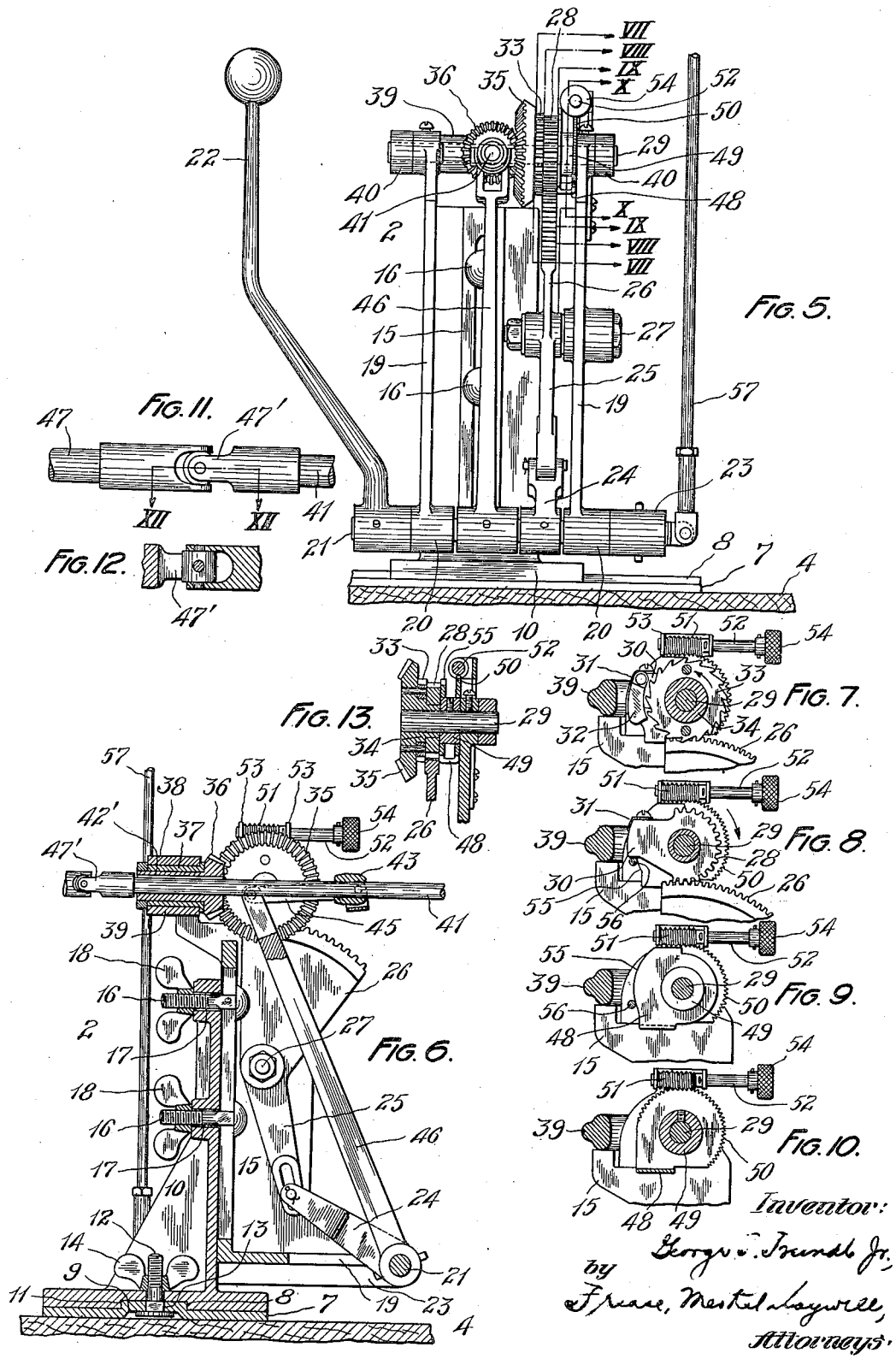

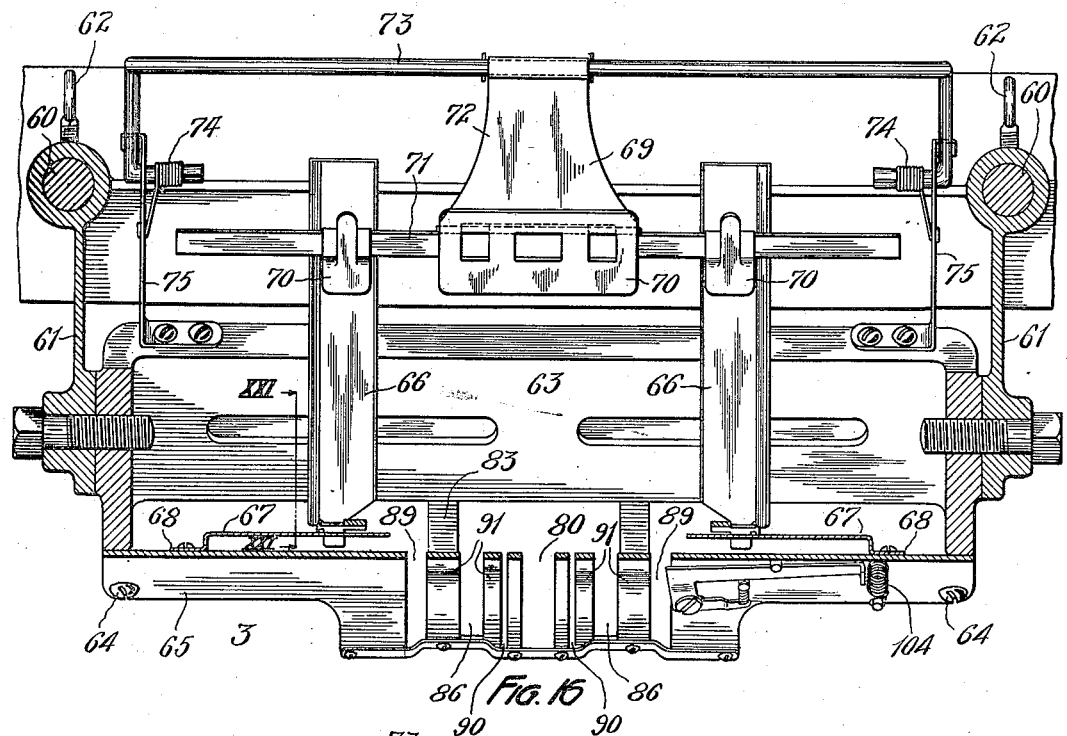
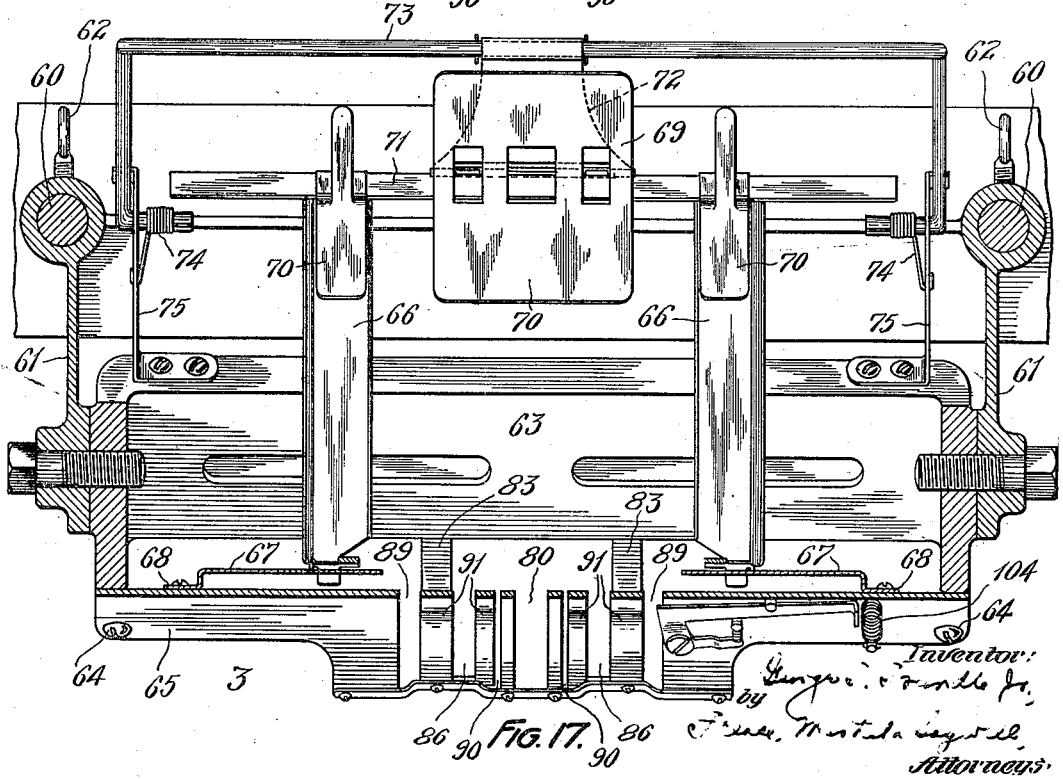

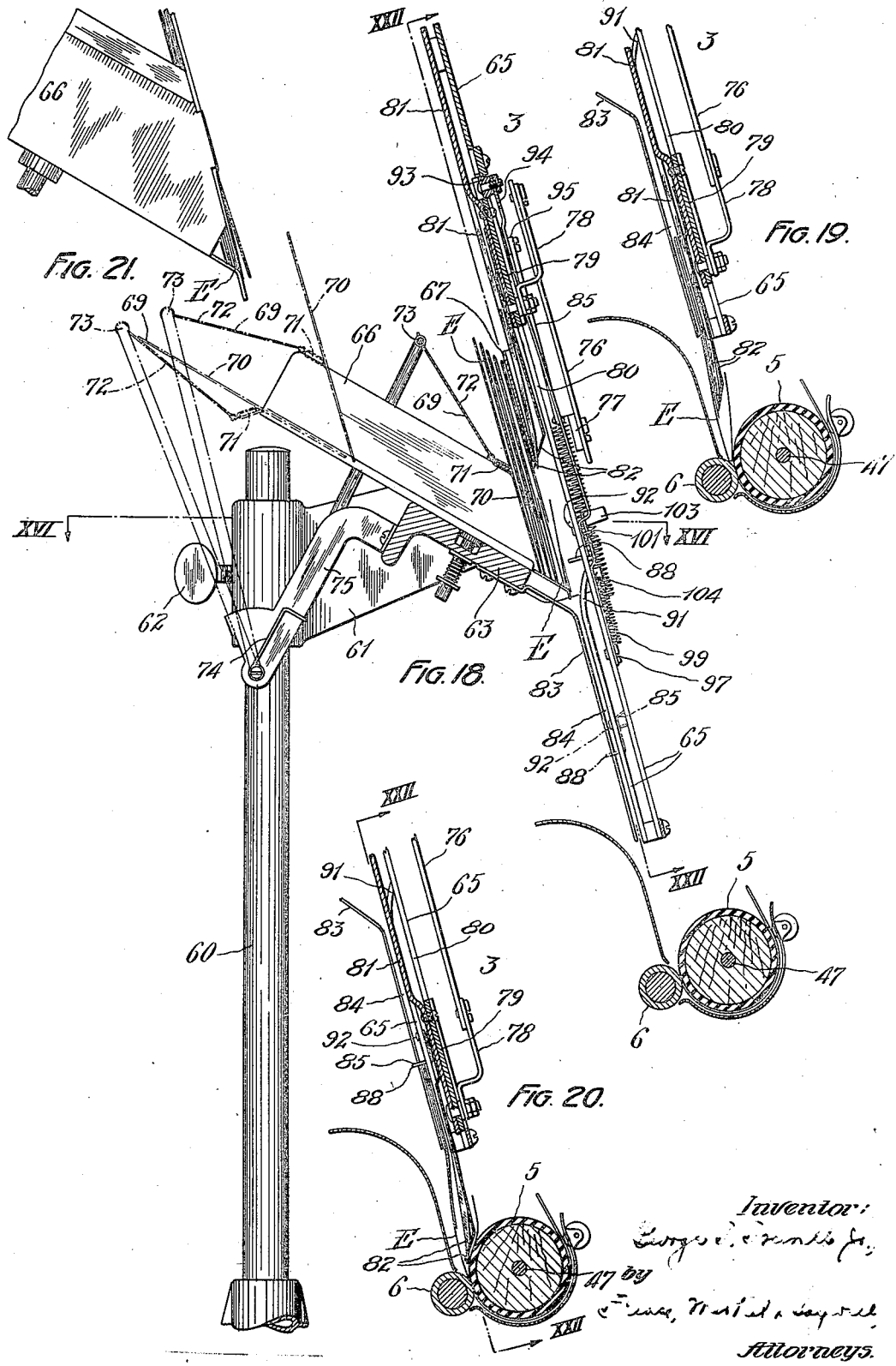

Patented Jan. 22, 1924.

1,481,489

UNITED STATES PATENT OFFICE.

GEORGE T. TRUNDLE, JR., OF CLEVELAND, OHIO, ASSIGNOR TO THE AMERICAN SPEED-O-FEEDER COMPANY, OF CLEVELAND, OHIO, A CORPORATION OF OHIO.

MACHINE FOR FEEDING ENVELOPES TO TYPEWRITING MACHINES.

Application filed January 21, 1921. Serial No. 438,911.

*To all whom it may concern:*

Be it known that I, GEORGE T. TRUNDLE, Jr., a citizen of the United States, resident of Cleveland, county of Cuyahoga, and State of Ohio, have invented new and useful Improvements in Machines for Feeding Envelopes to Typewriting Machines, of which the following is a specification, the principle of the invention being herein explained and the best mode in which I have contemplated applying that principle, so as to distinguish it from other inventions.

My invention relates to devices for automatically feeding envelopes to typewriting machines, and particularly to devices in which a feeding apparatus is employed embodying the general principles shown, described and claimed in U. S. Patent No. 1,196,706, issued August 29th, 1916, to Bert Langley.

The general object of the invention is to provide a feeding apparatus of the above-described character and of improved form, and at the same time provide means for simultaneously actuating said apparatus and the typewriter carriage, thereby reducing to a minimum the necessity, which heretofore existed, of manual manipulation, in the operation of the device as a whole.

The said invention consists of means hereinafter fully described and specifically pointed out in the claims.

More specifically, the invention consists of a primary feeding apparatus of the character embodied in said above-named patent, in combination with an actuating device, which I shall hereinafter refer to as the "engine," arranged to operate the primary feeding apparatus and so connected with the typewriting machine, as to actuate also the platen-roller to retract and also to partially rotate said roller to eject the envelope after it has been addressed on the said machine and to complete the feeding of the next envelope to be addressed, into said roller, such feeding, retraction and rotation being effected by a single manual operation.

The annexed drawings and the following description set forth in detail certain means embodying my invention, the disclosed means, however, constituting but one of the various forms in which the principle of the invention may be applied.

In said annexed drawings:

Figure 5 represents an end elevation, on the scale of Figures 3 and 4, of said engine.

Figure 6 represents a vertical section taken upon the plane indicated by line VI—VI in Figure 3, and viewed in the direction indicated by the arrows.

Figures 7, 8, 9 and 10 represent detail sections taken upon the planes indicated by lines VII—VII, VIII—VIII, IX—IX, and X—X, respectively, in Figure 5, and viewed in the direction indicated by the arrows.

Figure 11 represents, upon a still further enlarged scale, a side elevation of the universal joint connecting the engine with the typewriter platen roller, and Figure 12 a section thereof on the plane indicated by line XII—XII, Figure 11.

Figure 13 represents a detail vertical section taken upon a plane indicated by line XIII—XIII in Figure 3, looking in the direction indicated by the arrows.

Figure 16 represents a horizontal section taken upon the plane indicated by line XVI—XVI in Figures 14 and 18.

Figure 17 represents a horizontal section similar to Figure 16 showing certain parts in a different position.

Figure 18 represents a vertical transverse section taken upon the plane indicated by line XVIII—XVIII, Figure 14, showing the feeding members in their elevated positions.

Figure 19 represents a fragmentary section taken upon said plane, indicated by line XVIII—XVIII, showing the primary feeding member in nearly its lowermost position.

Figure 20 represents a view similar to Figure 19, showing the primary feeding member in its lowermost position, and secondary feeding member in contact with top of unaddressed envelope.

Figure 21 represents a fragmentary view taken upon the plane indicated by line XXI—XXI in Figure 16.

Figure 2:
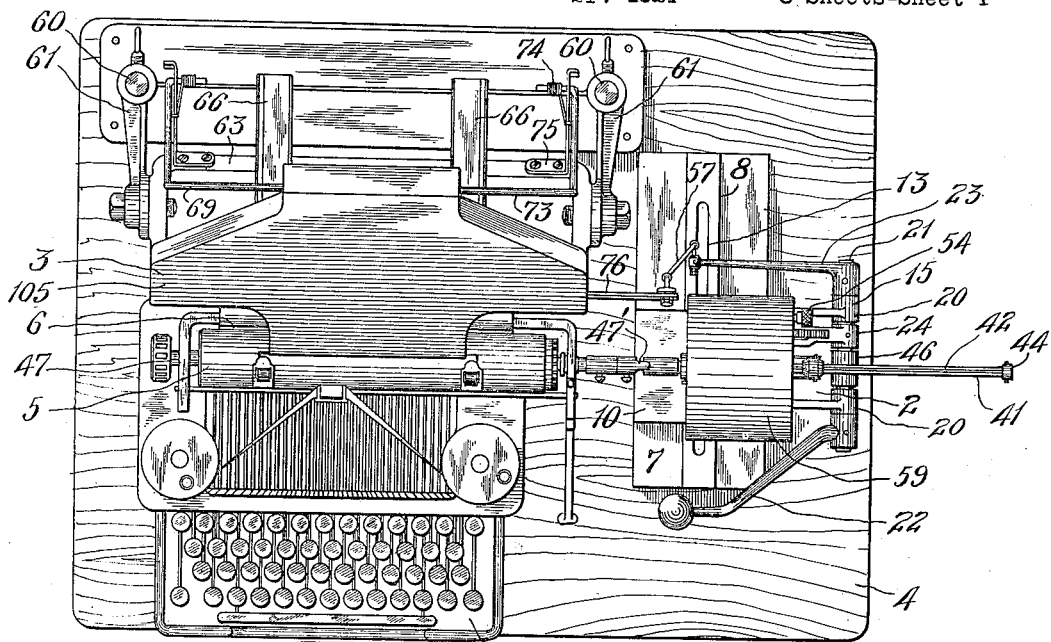
Figure 2 represents a plan of the complete device.

The illustrated embodiment of my invention includes the typewriter 1, the engine 2 and the primary feeding apparatus 3, all mounted upon a base 4.

The typewriter is positioned upon the base 4 and below the lower end of the feeding apparatus, and so placed that envelopes which are discharged from said apparatus will be projected behind the platen-roller 5 of the typewriter and in front of the pressure rollers 6 thereof, Figure 18, in the manner described in said above-mentioned U. S. patent, and as shown in Figure 20 of the drawings. The operation of the apparatus 3 to bring an envelope into the said described position is referred to hereinafter as the primary feeding operation. After the envelope has been so placed, the platen-roller 5 is partially rotated whereby such envelope is brought around said roller and into position to have the address typed upon it by the typewriter. This operation of the platen-roller is hereinafter referred to as the secondary feeding operation.

*The engine.*

Figure 3:
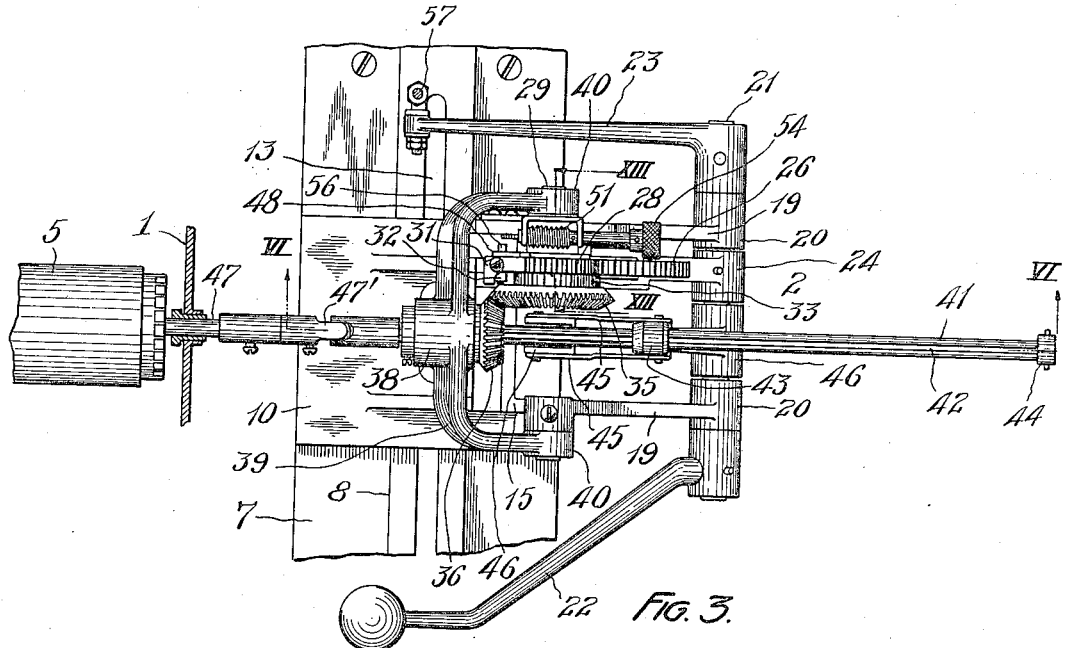
Figure 3 represents a plan, upon an enlarged scale, of the engine, with the hood removed, together with the end of the platen-roller of the typewriter, with which roller the engine is connected.
Figure 4:
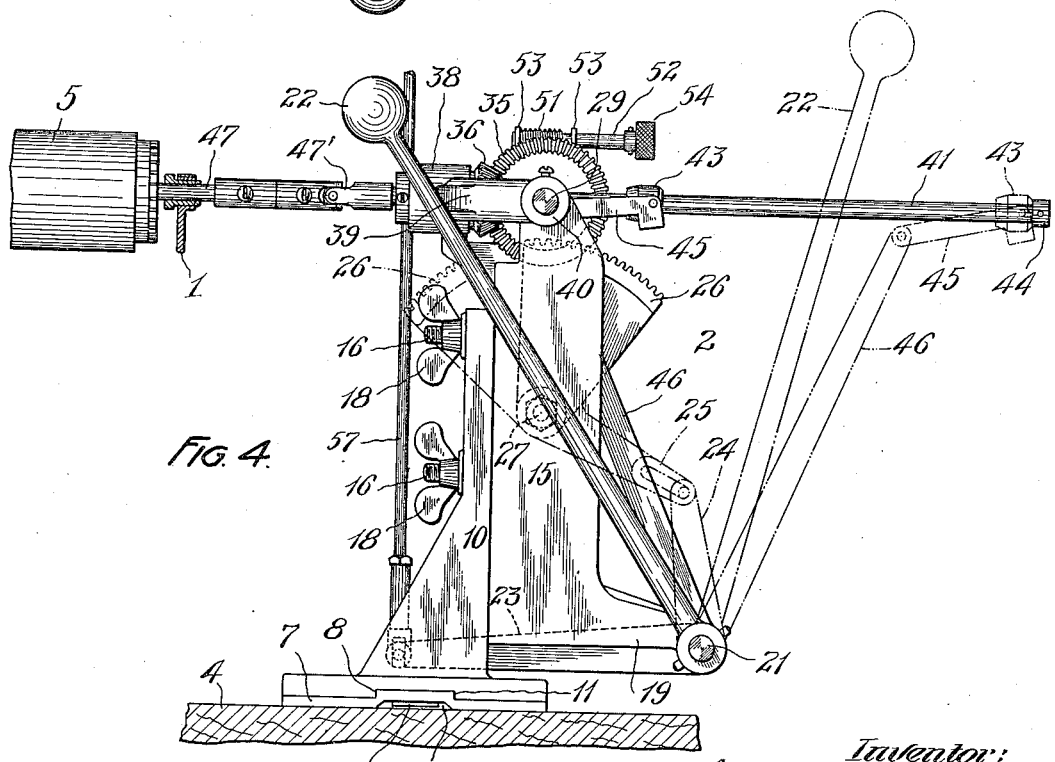
Figure 4 represents a front elevation of the parts shown in Figure 3.

Beyond and to the right of the typewriter 1 and suitably fastened to the base is a plate 7 provided with a centrally located guide 8 and a groove 9 beneath such guide, Figures 3, 4 and 6. Mounted upon the plate 7 is a standard 10 having a groove 11 in its lower surface, which fits the guide 8, so that the standard may be slid and adjusted transversely with respect to the axis of the platen-roller. A clamping bolt 12 with its head seated in the groove 9, passes through a slot 13 formed in the base-plate 7 and through the bottom of the standard, and has its upper end provided with a wing-nut 14, Figure 6, by means of which the standard may be clamped in the desired position upon said plate 7. The right-hand face of the standard 10 forms a vertical plane surface against which is seated a frame-member 15, secured and vertically adjustable on said face, by means of bolts 16 passing through the apertures 17—17 formed in the standard 10, Figure 6, together with wing nuts 18—18, as will be understood.

The lower end of member 15 is provided with two laterally extending arms 19—19, upon the ends of which are formed bearings 20—20, in which is journaled a rock-shaft 21. The front end of this shaft has fixed thereto an operating lever 22, and the opposite end thereof has fixed thereto a crank-arm 23, Figure 3.

Intermediately of the bearings 20—20, and fixed to said shaft 21, is a crank-arm 24, Figures 3, 5 and 6, whose free end articulates with the lower arm 25 of an oscillatory gear-segment 26 mounted upon a pivot 27 fixed to the frame-member 15. This segment 26 meshes with a segmental pinion 28 which is journaled upon a journal-rod 29 mounted upon and fixed in the upper part of the frame-member 15, as shown in Figures 3, 4 and 5, and also in detail in Figure 8. This pinion 28 is formed with an extension 30, Figure 8, upon which is fixed a leaf-spring 31 which projects laterally of said pinion and carries a pawl 32, as shown in Figure 3. Said pawl engages a ratchet-wheel 33 mounted and fixed upon the hub 34 of a bevel-gear 35 which is itself journaled upon the journal-rod 29. The gear 35 meshes with a bevel-pinion 36 which is provided with an extended hub 37 journaled in a bearing 38, Figure 6. This bearing is formed centrally of a yoke 39 which is provided with two end bearings 40—40, which are mounted upon the ends of the journal-rod 29.

The pinion 36 is formed with an axial cylindrical bore through which extends a reciprocable rod 41, provided with a longitudinal groove 42 which is engaged by a spline 42' fixed upon the interior of the pinion 36, Figure 6. The rod 41, therefore, may reciprocate longitudinally through said pinion, but is rotatively fixed relatively thereto.

A sliding cross-head 43 is mounted upon the rod 41, and the latter is provided at its right-hand end with a fixed collar 44 which limits the movement of said cross-head on the rod. Articulating with the latter are two links 45—45, which also articulate with the upper end of a crank-arm 46, Figures 3, 5 and 6.

The left-hand end of the rod 41 is connected with the spindle 47 of the platen-roller 5, Figures 1, 2, 11 and 12 by means of a universal joint 47'.

Oscillatorily mounted upon the journal rod 29 is a U-shaped adjustable pawl-releasing device 48, mounted upon a separating-collar 49 fixed to rod 29, Figure 13. The upper edge of the rearmost leg of said releasing device, is provided with worm-gear teeth to form a worm-wheel segment 50, Figure 10. This segment is engaged by a worm 51 fixed upon a small shaft 52 mounted in suitable bearings 53—53 mounted on the frame member 15, and provided with a knurled end-piece 54.

The front leg of said releasing device 48, is provided with a cam-surface 55, upon its edge, and the surface is engaged by a pin 56 which is secured to and projects rearwardly from the pawl 32, as shown in Figure 9. When the pin 56 rides upon the higher portion of the cam-surface, the pawl will be out of engagement with the ratchet-wheel. By turning the shaft 52, the position of the cam-surface 55 may be altered and hence the length of the arcual movement of the pawl 32 during which it engages the ratchet-wheel 33 may be lengthened or shortened, for a purpose which will be hereinafter specifically described.

Operation of the engine.

Figure 1:
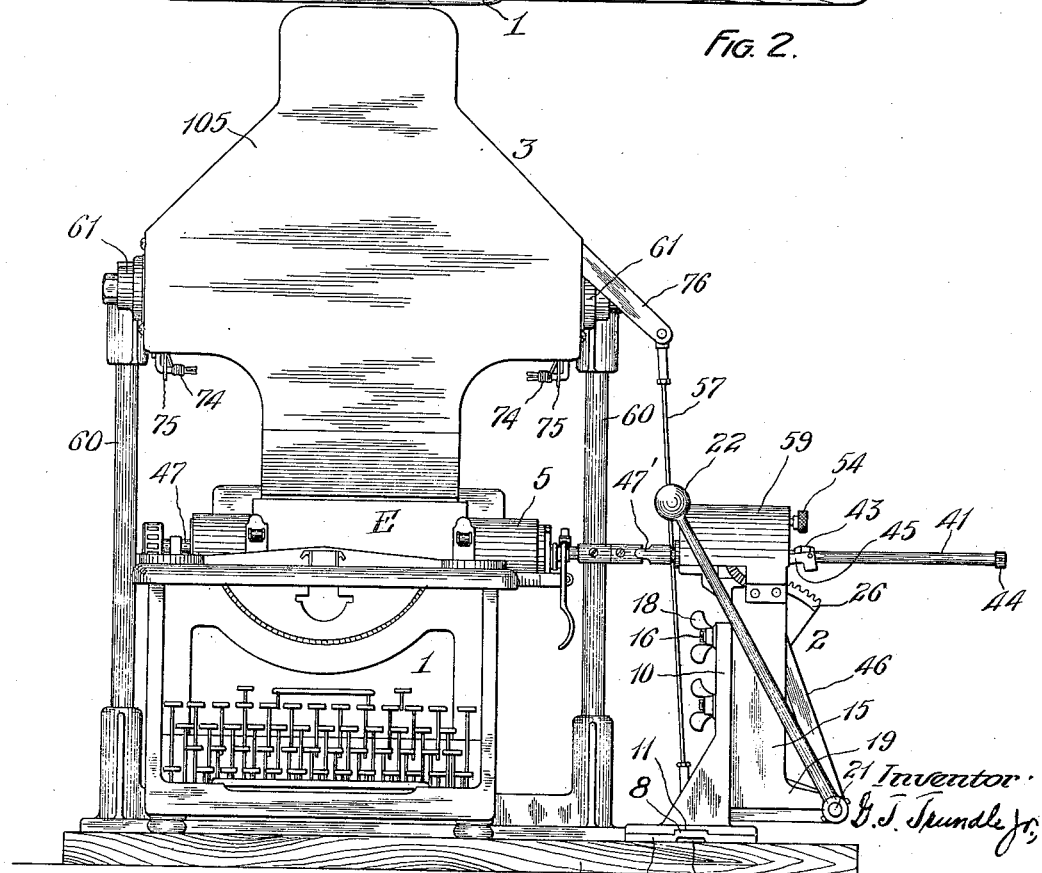
Figure 1 represents a front elevation of a device embodying my invention, shown in conjunction with a typewriting machine of a standard type.

Let it be assumed that the parts are in the position illustrated by the full lines in Figures 1 to 5 inclusive, in which the platen-roller 3 is in its extreme right hand position, and that the primary and secondary feeding operations (hereinafter to be specifically described) have both been performed. Such being assumed to be the case, an envelope E will have been placed in position upon the platen-roller, ready for receiving the address, as shown in Figure 1.

The typewriter 1 now being operated to inscribe the required address upon the envelope, the platen-roller travels from right to left, and carries with it the reciprocable rod 41. Should it become necessary during such operation by partial rotation to advance the platen-roller so as to type on a lower line, or shift the platen-roller longitudinally, such advance or shifting may be effected, as it will merely turn the rod 41, which will turn the pinion 36, the gear 35, and the ratchet wheel 33, the latter in the direction indicated by the arrow in Figure 7. Such latter movement will hence not be prevented should the pawl 32 be in engagement with said wheel, as the teeth of the latter will merely pass successively past said pawl, as will be readily understood. In shifting the platen-roller longitudinally, the rod 41 will merely slide in bevel pinion 36.

After the typing operation has been completed, the engine is operated to restore the platen-roller to its initial position, partially rotate the said roller to effect the secondary feeding operation, and also to actuate the primary feeding apparatus.

This is done by throwing the operating lever from the position shown in Figures 2 and 4, in full lines, over to the right into the position shown in dotted lines in Figure 4, and then back to the initial position, thus completing one oscillation of said lever.

In throwing said lever to the right, crank arm 46 moves the cross-head 43 along rod 41 until it strikes the end collar 44, whereupon a further movement of the said lever to the right carries the rod 41 to the right, and pulls along with it the platen-roller 5 which is thus restored to its initial position. This same movement also results in the actuation of the primary feeding device through the instrumentality of a connecting rod 57 articulating with the end of the crank arm 23 mounted upon the rock shaft 21, Figures 2 and 5. Such actuation of the primary feeding apparatus causes an envelope to be fed to the platen-roller and inserted a short distance between it and the pressure rollers 6, as in the construction described in the previously mentioned patent.

In said described movement of the operating lever, the bevel-gear and pinion remain stationary, but the gear-segment 26 and the segmental pinion 28 are moved, the pawl 32 riding freely over the teeth of the ratchet wheel 33, in the direction indicated by the arrow in Figure 8.

The lever 22 upon its return movement, permits the rod 41 to remain longitudinally stationary, but moves the gear segment back again, which actuates the segmental pinion 28 in the direction indicated by the arrow in Figure 7, and thus partially rotates the bevel gears and the rod 41. Such partial rotation of the rod, partially rotates the platen-roller which thus performs the secondary feeding operation and brings the envelope just previously supplied by the primary feeding apparatus, into typing position. At the same time, such secondary feeding operation discharges the addressed envelope from the platen-roller and the entire above-described operation may be repeated.

The amplitude of the partial rotation of the platen roller may be varied by adjusting the cam-surface 55 by turning the knurled end-piece 54 and thus provide for the proper secondary feeding operation and discharge of envelopes of different widths, as will be understood.

By providing the adjustment of the engine upon the plate 7 and the vertical adjustment of the frame member 15, it will be seen that the proper alinement of the platen-roller spindle with the rod 41 may be obtained.

By mounting the rod 41 in the oscillatory yoke 39 and also connecting it with the platen-roller spindle by means of a universal joint, the proper flexibility of connection is obtained to allow the platen-roller to be shifted up or down by the shift-key of the typewriter, in such of the latter in which such shifting movement is a characteristic. A suitable removable sheet-metal hood 59 is preferably provided to cover the gears of the engine, as shown in Figures 1 and 2.

*The primary feeding apparatus.*

Suitably secured to the base 4 are two upright standards 60—60, Figure 1, upon which are slidably mounted two forwardly projecting arms 61—61, which may be fixed in any desired position upon said standards, by set-screws 62—62, Figure 18. These arms carry a transverse frame-member 63 to the front of which is secured, by means of screws 64—64, a downwardly and forwardly inclined plate 65.

Also secured to said transverse member 63 are two slideways 66—66, forming a magazine in which the envelopes E may be stacked, Figure 18. These slideways incline downwardly and forwardly, and the forward end of the magazine terminates at a guard-plate 67, which is secured to the back of plate 65, Figures 16, 17 and 22, having offset lugs 68 which space plate 67 from plate 65. The front of the stack of envelopes rests against guard plate 67.

The said stack is held upright in the magazine and pushed forward by means of a suitable follower 69, of any desired construction. In the form of follower shown, follower-plates 70 are mounted upon a transverse bar 71 which is suitably carried on a plate 72 pivoted upon a transverse rod 73, actuated by coiled springs 74—74, said rod being supported by two brackets 75—75, secured to member 63, as shown in Figures 16 and 17. The bar 71 rests and slides upon the upper edges of the side flanges of the slide-ways 66, Figure 18.

Figure 14:
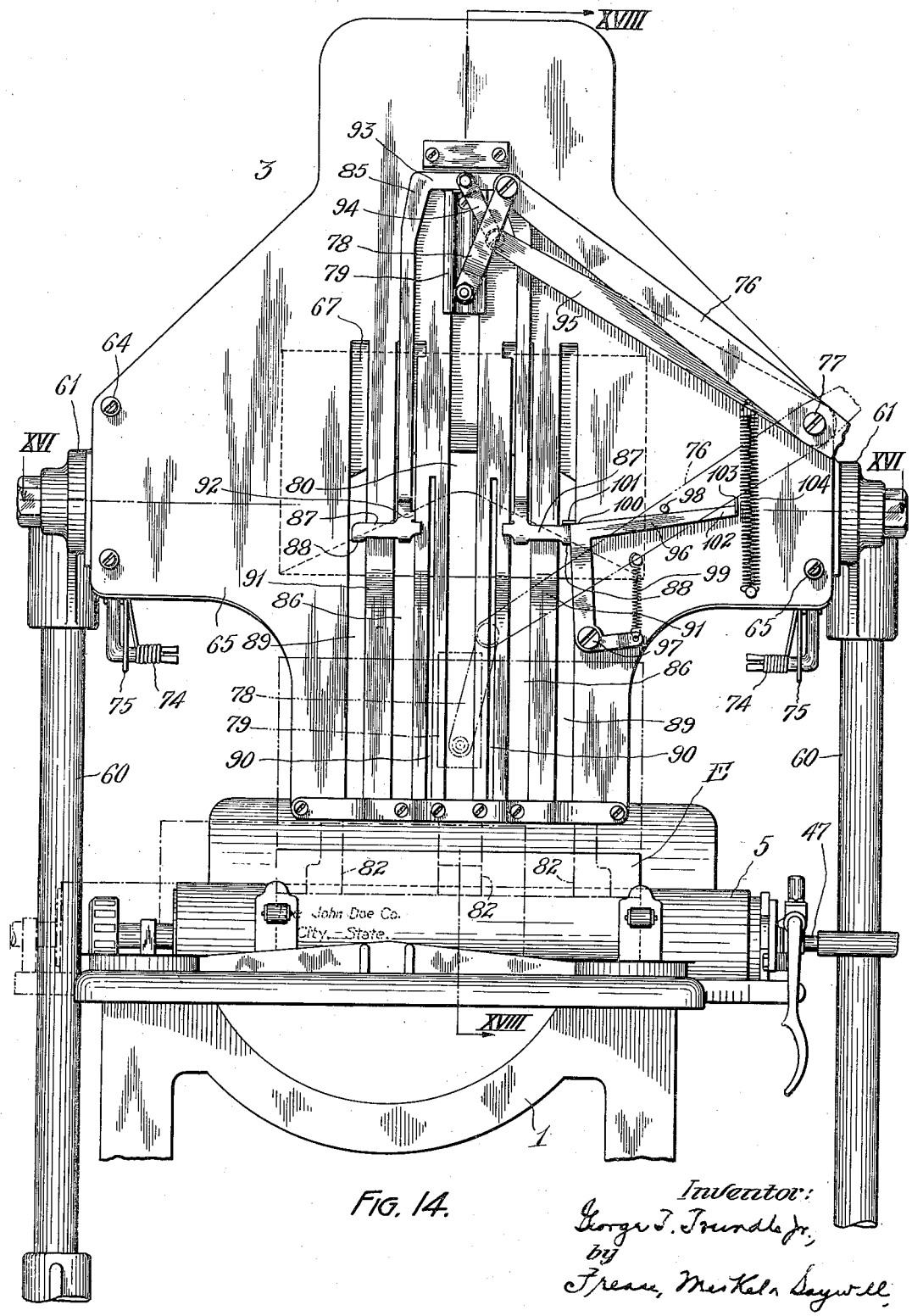
Figure 14 represents a front elevation, with the cover-plate removed, of the primary feeding apparatus, upon an enlarged scale, showing also the upper portion of the typewriter, and also showing the primary and secondary feeding members in their elevated positions, which they occupy prior to the feeding operation.
Figure 22:
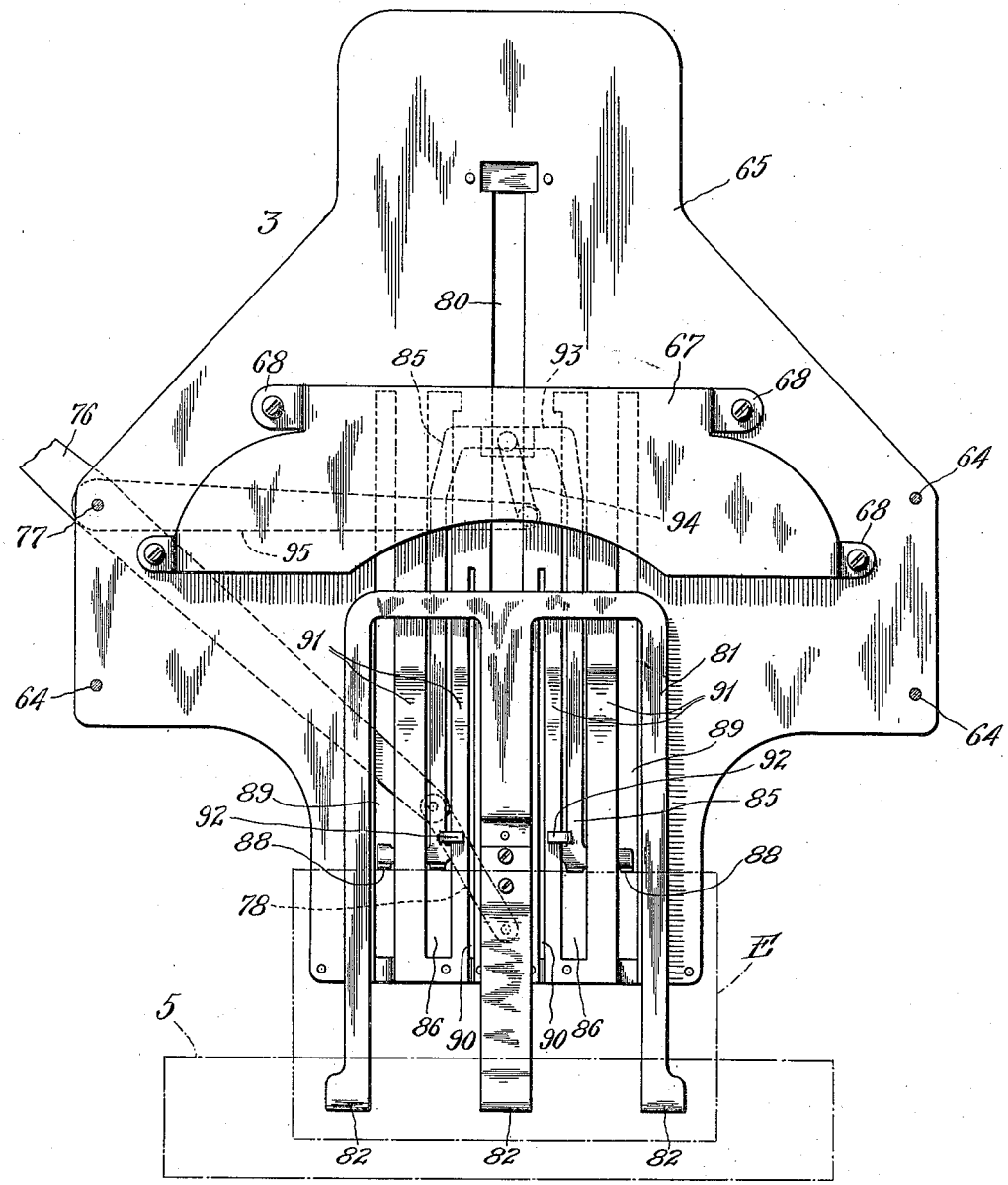
Figure 22 represents a rear elevation of the primary feeding apparatus, upon a plane indicated by line XXII—XXII in Figure 18.

The upper end of connecting rod 57, Figure 1, articulates with a laterally projecting arm of a lever 76 pivoted at 77, upon the right-hand side of plate 65, Figure 14, and the opposite end of said lever is connected by means of a link 78 with a cross-head 79 which slides up and down in a slot 80 cut through the plate 65. Lying against the back of said plate and attached to said cross-head is the primary feeding member 81, Figure 22, having three fingers 82—82—82, made of thin sheet-metal and very light and flexible, the lower ends of which are curved backwardly, as shown in Figures 18 and 22. This member 81 passes behind the guard-plate 67 at the upper part of its travel.

The envelopes are placed in the magazine, as described in said above-mentioned patent, with their flaps projecting upwardly and all lying upon the front of the stack, and the backwardly projecting ends of the fingers 82—82—82 reach a position above the envelope flaps, when the primary feeding member is in its uppermost position.

As the said member travels downwardly, these finger ends enter the space between the flap of the foremost envelope and the body thereof, so that further downward movement separates such envelope from the stack and carries it downwardly and allows it to fall between the platen-roller 5 and the pressure rollers, which latter are properly located for the purpose.

Suitable downwardly extending sheet-metal strips 83 are secured to the bottom of frame-member 63 and form a guideway 84 between them and the plate 65, as shown in Figure 18, through which the envelopes pass and by means of which they are properly guided to the platen-roller.

By reason of light flexible construction of fingers 82—82—82, during the up-stroke of the primary feeding member, they will pass over the foremost envelope with a slight pressure and without dislocating same from the stack.

Figure 15:
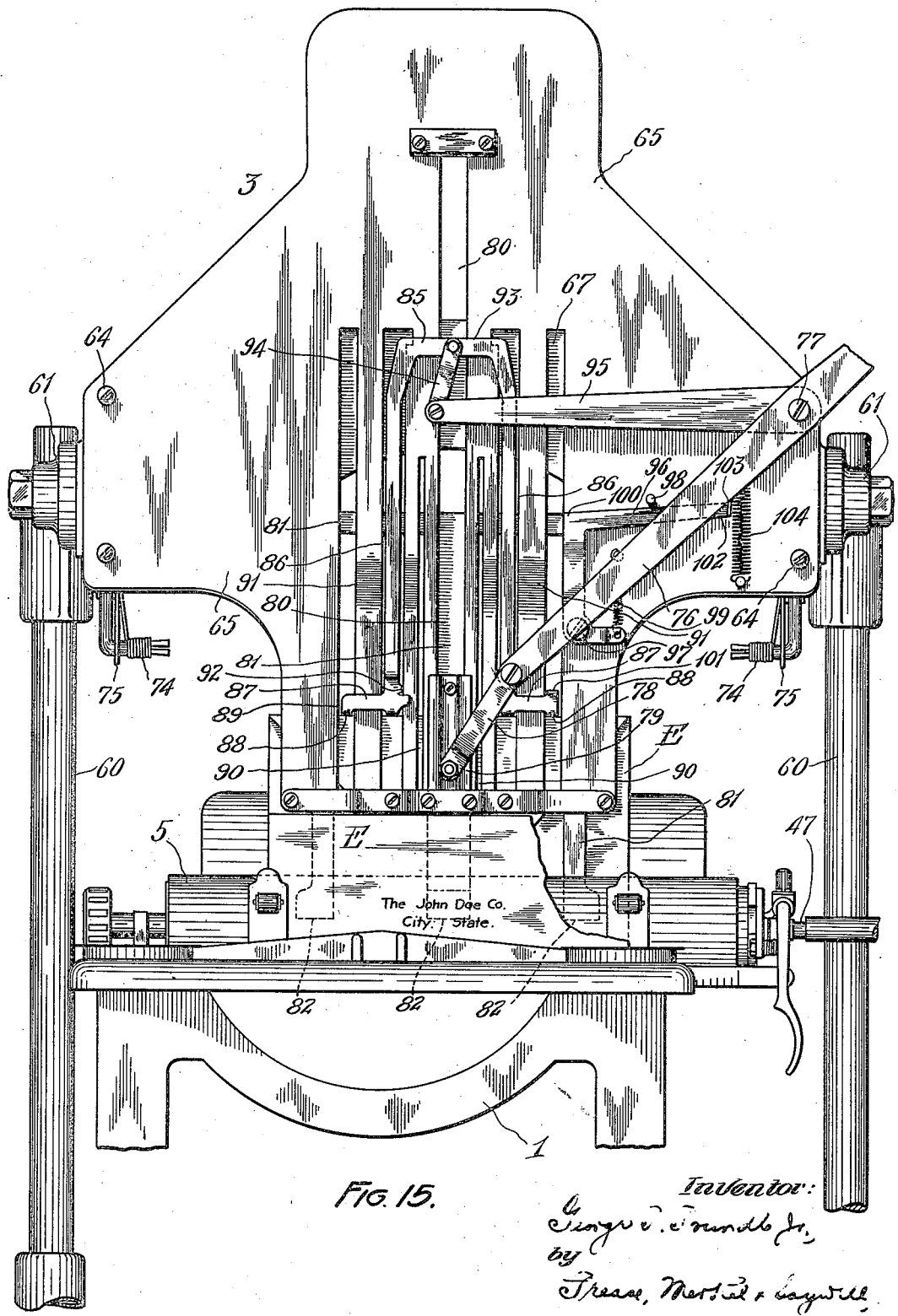
Figure 15 represents a view similar to Figure 14, showing the said feeding members in their lowermost positions, which they occupy after the completion of that part of the feeding operation performed by the primary feeding apparatus.

A secondary sliding feeding member 85, Figures 14 and 15, is provided on the front of plate 65, consisting of a U-shaped frame, the lower ends of whose two legs respectively slide and are suitably guided in two slots 86—86, Figures 14, 15 and 22. These lower ends are furthermore provided with laterally projecting members 87—87, whose lateral extremities are respectively provided with rearwardly extending lugs 88 and which pass through slots 89—89, respectively, Figures 18 and 22. These lugs project a short distance beyond the rear face of the plate, but a distance such that, as they pass in front of the stack of envelopes, they will not come in contact with the foremost envelope. Additional rearwardly extending lugs 88 are also provided on the inner ends of the members 87—87, which project through slots 86—86, Figure 22.

Two additional slots 90—90 are cut in the plate 65, and lie respectively between the slots 86—86, and the main central slot 80—80, Figures 14, 15 and 22. That part of the plate lying between the slots 89 and 86 and between the slots 86 and 90, is bent backwardly at 91, and in a plane below the bottom of the stack of envelopes E, as shown in Figures 14 and 18. The members 87—87 are further provided with hooks 92—92, Figure 22, which overlap the back of the plate adjacent to the slots 86—86. These hooks, therefore, force the lower end of the secondary feeding member 85, to follow the conformation of that part of the plate adjacent to said slots 86, so that during the lower portion of the travel of said member, the lower end of the latter will be carried backwardly and cause the lugs 88—88 to traverse the guideway 84, as will hereinafter appear.

The upper cross-member 93 of the secondary member 85, lies in the path of reciprocation of the cross-head 79, and is connected with an arm 94 pivoted also at 77, by means of a link 95.

Upon the front of the plate 67, is also mounted a detent 96 pivoted at 97 and actuated to normally engage a stop-pin 98, by a light coil spring 99. A portion 100 of this latch projects normally into the path of movement of a forwardly projecting lug 101 formed upon the right hand member 87 of the secondary feeding member 85, and as shown in Figure 14, supports said member in its uppermost position. An arm 102 of the detent, is provided with a forwardly projecting lug 103, lying in the path of oscillation of lever 76.

*Operation of the primary feeding apparatus.*

Assuming the parts to be in the positions illustrated by the full lines in Figure 14, the position of the lever 76 is that imparted to it by the initial position of the operating lever 22. The latter now being thrown to the right, the left-hand arm of lever 76 is carried downwardly as a result of which the cross-head 79 and primary member 81 are moved downwardly into the position shown in Figure 15. The fingers 82—82—82, as previously described, engage the foremost envelope and carry it down through the guideway 84 and permit it to drop with its lower edge resting between the platen-roller 5 and pressure-rollers 6, as shown in Figure 19 and in dotted lines in Figure 22. The action is so timed that the envelope reaches the described position after the platen-roller has been retracted, as a result of the previously described operation of the engine and its connection with the primary feeding device.

Near the lower end of the downward travel of the primary feeding member 81, the lever 76 engages the lug 103 of detent 96, and releases the secondary member 85, which falls by gravity and hence follows the movement of the primary member. During the lower portion of its downward travel, the lower end of the said secondary member, is deflected backwardly by the backwardly bent and previously described portion of the plate 65, so that after the envelope reaches the above described position, the lugs 88—88 strike the top of the said envelope and force it a short distance between the platen and pressure-rollers, as shown in Figure 20, and thus effect the second step in the primary feeding operation, as in the case of the device described in the said above-mentioned patent.

The envelope is now in a position in which the rotation of the platen-roller will effect the secondary feeding operation.

The above described operation is then followed by the return of the main operating lever 76, during which, as previously explained, the partial rotation and secondary feeding operation is effected. During the movement, the primary and secondary feeding member are also returned to their initial position.

I also prefer to supply a coil-spring 104, Figures 14 and 15, secured at one end to the plate 65 and at the other to the lever 76, to facilitate the starting of the secondary feeding member, when released, upon its downward path.

The parts of the primary feeding apparatus are preferably covered by a removable sheet metal plate 105, as shown in Figures 1 and 2.

What I claim is:

1. The combination of a typewriting machine; a work-feeding device adapted to supply work-members successively to said machine; and reciprocating means connected with the typewriter carriage and with said feeding device so as to actuate the latter; said reciprocating means being arranged so as to effect the actuation of said feeding means during one stroke and the rotation of the carriage platen during its other stroke.

2. The combination of a typewriting machine; a work-feeding device adapted to supply work-members successively to said machine; and reciprocating and rotating mechanism connected with the shaft of the platen and with said feeding means and adapted to actuate the latter; said mechanism being arranged to effect the actuation of said feeding means at the end of one reciprocating stroke thereof and to effect the rotation of said shaft during the other stroke thereof.

3. The combination of a typewriting machine; a work feeding device; means for supporting said work feeding device independently of the carriage and platen of said machine; and a single mechanism connected between said work feeding device and said platen and having control means for initially moving the platen into position to receive the work and to subsequently rotate the platen while in said position.

4. The combination of a typewriting machine; a work feeding device; means for supporting said work feeding device independently of the operable parts of the machine; and a single mechanism connected to said work feeding device and the platen of the machine; said mechanism including a controlling device for insuring first the moving of said platen into position to receive the work and subsequently the rotation of the platen while in such position, said controlling member also insuring the completion of the feeding operation of said work feeding device prior to the rotation of the platen.

5. In operating mechanism for a work feeding device, the combination of a reciprocable carriage retracting member adapted to be attached to the shiftable platen roller of a typewriting machine; a shifting lever operable upon movement in one direction to retract said member; means connected with said lever for rotating said member upon completion of the retractive movement thereof; and means connected with said lever adapted to be attached to the work feeding device to actuate the same.

6. In operating mechanism for a work feeding device, the combination with a reciprocating member adapted for attachment to the platen of a typewriting machine; a support for said reciprocating member; adjustable means on said support for limiting the degree of reciprocating movement of said member; and means for actuating said member and feeding device.

7. The combination of a typewriting machine having a platen roller; a work-feeding device arranged adjacent to the machine and independently of said platen roller; means for feeding work to the platen roller when in a predetermined position; means for operating the platen roller and arranged independently of the machine and the working parts thereof, said platen operating means being arranged to rotate and to reciprocate, a flexible shaft connection between the platen operating means and the platen for permitting the usual adjustments and operations of the platen independently of said operating means and adapted, upon operation of the work-feeding means, to move said platen first into position to receive and subsequently into position to grip the work.

8. In combination with the platen roller of a typewriting machine, a suitable support; a carriage retracting bar attached to said roller mounted so as to be rotatable and longitudinally reciprocable in said support; an oscillatory lever; and connection between said lever and bar adapted to retract the latter during one stroke of said lever and impart a rotatory movement thereto during the other stroke of said lever.

9. In combination with a typewriting machine having a platen roller; work-feeding mechanism arranged adjacent to the machine and independently of the operative parts of the same; operating mechanisms arranged independently on the machine and connected to the work feeding mechanisms for actuating it; a flexible shaft adapted for connection with the platen roller of the machine and having a portion engaged by the latter; said operating device including a reciprocating element connected to said flexible shaft for moving it in a lengthwise direction and said operating device including a variably operable element engaging the flexible shaft and adapted to turn the same into various degrees; and means for controlling the throw of said reciprocating elements for turning the platen to the desired degree.

10. In combination with the platen roller of a typewriting machine, the combination of a suitable support; a carriage retracting bar attached to said roller mounted so as to be rotatable and longitudinally reciprocable in said support; an oscillatory lever; connections between said lever and bar adapted to retract the latter during one stroke of said lever and impart a rotatory movement thereto during the other stroke of said lever; and adjusting means for varying the length of the arc of such rotatory movement.

11. In combination with the platen roller of a typewriting machine; the combination of a support provided with a bearing; a bevel pinion having a central axial bore and having an extension forming a journal mounted in said bearing; a carriage retracting bar attached to said roller seated and slidable in said bore and having a spline and groove connection with said bevel-pinion; a bevel-gear meshing with said pinion and a ratchet wheel secured thereto, and mounted upon said support; a gear-segment mounted co-axially with said bevel-gear and a pawl mounted in said segment, said pawl engaging said ratchet-wheel; a second gear-segment mounted upon said support and meshing with said first-named segment; an operating lever, oscillatorily mounted on said support; and connections between said lever and second-named segment, for oscillating the latter.

12. In an envelope-feeding device, the combination of a magazine for holding the envelopes; a primary feeding-member having a path of movement such as will cause it to engage an envelope in said magazine behind its flap; means for positively reciprocating said primary member; a secondary feeding-member having a feeding movement independent of the feeding movement of said primary member; and restraining means for said secondary feeding-member adapted to be rendered inoperative upon a predetermined movement of said primary feeding-member.

13. In an envelope-feeding device, the combination of a magazine for holding the envelopes; a primary movable feeding-member having a path of movement such as will cause it to engage an envelope in said magazine behind its flap; a secondary movable feeding-member adapted to engage the upper edge of such envelope after it has been fed by said primary member; an actuating arm connected with said primary member; and means for holding said secondary member in an elevated position; said arm adapted to engage said holding means so as to actuate same to release said secondary member and allow the latter to be actuated.

14. In an envelope-feeding device, the combination of a frame-plate; a primary feeding member reciprocably mounted upon said plate; a secondary feeding-member reciprocably mounted upon said plate and having a movement parallel with that of said primary member; and said plate being provided with curved guides upon which said secondary member slides, whereby the path of feeding movement of said secondary member is changed.

15. In an envelope-feeding device, the combination of an upright plate; a primary feeding-member reciprocably mounted upon said plate; an actuating lever suitably mounted and having one arm articulating with said member; and a secondary feeding-member mounted to reciprocate upon said plate and independently of said primary member.

16. In an envelope-feeding device, the combination of an upright plate; a primary feeding-member reciprocably mounted upon said plate; an actuating lever suitably mounted and having one arm articulating with said member; and a secondary feeding-member mounted to reciprocate upon said plate and independently of said primary member; said secondary member being interposed in the path of reciprocation of said primary member.

17. In an envelope-feeding device, the combination of an upright plate; a primary feeding-member reciprocably mounted upon said plate; an actuating lever suitably mounted and having an arm articulating with said member; a secondary feeding-member mounted to reciprocate upon said plate independently of said primary member; said secondary member being interposed in the path of reciprocation of said primary member; and means for oscillating said secondary member so as to change its path of movement during reciprocation.

Signed by me this 18th day of January, 1921.

GEORGE T. TRUNDLE, Jr.